United States Patent
Guo et al.

(10) Patent No.: US 11,126,717 B2
(45) Date of Patent: *Sep. 21, 2021

(54) TECHNIQUES FOR IDENTIFYING COMPUTER VIRUS VARIANT

(71) Applicant: Alibaba Group Holding Limited, Grand Cayman (KY)

(72) Inventors: Yuehua Guo, Hangzhou (CN); Honggang Tang, Hangzhou (CN)

(73) Assignee: BANMA ZHIXING NETWORK (HONG KONG) CO., LIMITED, Kowloon (HK)

( * ) Notice: Subject to any disclaimer, the term of this patent is extended or adjusted under 35 U.S.C. 154(b) by 24 days.

This patent is subject to a terminal disclaimer.

(21) Appl. No.: 16/588,398

(22) Filed: Sep. 30, 2019

(65) Prior Publication Data

US 2020/0026854 A1 Jan. 23, 2020

Related U.S. Application Data

(63) Continuation of application No. 15/016,048, filed on Feb. 4, 2016, now Pat. No. 10,460,106.

(51) Int. Cl.
*G06F 21/56* (2013.01)
(52) U.S. Cl.
CPC .......... *G06F 21/564* (2013.01); *G06F 21/561* (2013.01); *G06F 21/568* (2013.01)
(58) Field of Classification Search
CPC ..... G06F 21/564; G06F 21/561; G06F 21/568
See application file for complete search history.

(56) References Cited

U.S. PATENT DOCUMENTS

| 5,440,723 A | 8/1995 | Arnold et al. |
| 5,452,442 A | 9/1995 | Kephart |

(Continued)

FOREIGN PATENT DOCUMENTS

| CN | 102622536 A | 8/2012 |
| CN | 102622536 A | 8/2012 |

(Continued)

OTHER PUBLICATIONS

Shankarapani et al., Malware detection using assembly and API call sequences published online: Apr. 3, 2010 (Year: 2010).

(Continued)

*Primary Examiner* — Alexander Lagor
*Assistant Examiner* — Vu V Tran (57) ABSTRACT

A method and apparatus for identifying computer virus variants are disclosed to improve the accuracy of virus identification and removal, and may relate to the field of internet technology. The method includes running a virus sample to be tested and recording an API call sequence produced during running of the virus sample. The method further includes obtaining a characteristic API call sequence for each one of a plurality of virus families, matching the API call sequence produced during running of the virus sample to be tested with the characteristic API call sequences of the virus families, and obtaining a matching result. The method also includes determining the virus sample to be tested is a virus variant by extent of a match between the API call sequence produced by the virus sample and any characteristic API call sequence of any one of the virus families.

19 Claims, 3 Drawing Sheets

(56) References Cited

U.S. PATENT DOCUMENTS

| | | | |
|---|---|---|---|
| 5,684,875 | A | 11/1997 | Ellenberger |
| 6,017,536 | A | 1/2000 | Barney et al. |
| 6,067,618 | A | 5/2000 | Weber |
| 6,228,983 | B1 | 5/2001 | Barney et al. |
| 6,347,375 | B1 | 2/2002 | Reinert et al. |
| 6,356,937 | B1 | 3/2002 | Montville et al. |
| 6,792,543 | B2 | 9/2004 | Pak et al. |
| 7,266,844 | B2 | 9/2007 | Teblyashkin et al. |
| 7,284,273 | B1 | 10/2007 | Szor |
| 7,356,736 | B2 | 4/2008 | Natvig |
| 7,360,253 | B2 | 4/2008 | Frank et al. |
| 7,478,431 | B1 | 1/2009 | Nachenberg |
| 7,500,236 | B2 | 3/2009 | Janzen |
| 7,822,782 | B2 | 10/2010 | Chakravarty et al. |
| 7,992,143 | B2 | 8/2011 | Janzen |
| 8,069,372 | B2 | 11/2011 | Natvig |
| 8,239,959 | B2 | 8/2012 | Gellerich |
| 8,250,655 | B1 | 8/2012 | Malanov et al. |
| 8,424,091 | B1 | 4/2013 | Su et al. |
| 8,490,080 | B2 | 7/2013 | Janzen |
| 8,555,385 | B1 | 10/2013 | Bhatkar et al. |
| 8,881,286 | B2 | 11/2014 | Yu |
| 9,165,142 | B1* | 10/2015 | Sanders ............ H04L 63/1441 |
| 9,202,053 | B1 | 12/2015 | Huang et al. |
| 10,460,106 | B2 | 10/2019 | Guo et al. |
| 2007/0083930 | A1 | 4/2007 | Dumont et al. |
| 2008/0195612 | A1 | 8/2008 | Chakravarty et al. |
| 2008/0201129 | A1 | 8/2008 | Natvig |
| 2009/0077363 | A1 | 3/2009 | Janzen |
| 2009/0313700 | A1* | 12/2009 | Horne ................ G06F 21/564 726/24 |
| 2010/0115620 | A1 | 5/2010 | Alme |
| 2010/0154062 | A1 | 6/2010 | Baram et al. |
| 2010/0306848 | A1 | 12/2010 | Gellerich |
| 2011/0047618 | A1 | 2/2011 | Evans et al. |
| 2011/0296403 | A1 | 12/2011 | Janzen |
| 2012/0124007 | A1 | 5/2012 | Sten et al. |
| 2012/0173155 | A1 | 7/2012 | Aurora et al. |
| 2014/0150105 | A1 | 5/2014 | Yu |
| 2014/0283066 | A1 | 9/2014 | Teddy et al. |
| 2015/0161386 | A1 | 6/2015 | Gupta et al. |
| 2015/0180883 | A1 | 6/2015 | Aktas et al. |
| 2016/0099963 | A1* | 4/2016 | Mahaffey ............ G06F 21/554 726/25 |

FOREIGN PATENT DOCUMENTS

| | | |
|---|---|---|
| CN | 102930210 | 2/2013 |
| CN | 102930210 A | 2/2013 |
| CN | 103839005 A | 6/2014 |
| CN | 103839005 A | 6/2014 |

OTHER PUBLICATIONS

Peng Guojun et al, "Behavior-based Android malware family classification system", Technology World, China Academic Journal Electronic Publishing House, Aug. 31, 2014, www.cnki.net.

Journal of Xi'an University of Posts and Telecommunications, Realization of vicious procedures detection system based on vital technology, doi; 10.13682/j.issn 2095-6533.2014.02.014, vol. 19 No. 2 Mar. 2014, Wu Chen, Wang Xiong, 5 pages.

Peng Guojun et al., "Behavior-based Andriod Malware Family Classification System", Technology World, China Academic Journal Electronic Publishing House, Aug. 31, 2014, www.cnki.net.

Shankarapani et al., Malware detection using assemby and API call sequences, published online Apr. 3, 2010 (Year: 2010).

* cited by examiner

TECHNIQUES FOR IDENTIFYING COMPUTER VIRUS VARIANT

CROSS-REFERENCE TO RELATED APPLICATION

This application is a continuation of U.S. patent application Ser. No. 15/016,048 filed Feb. 4, 2016, and claims priority to Chinese Patent Application No. 201510065074.8, filed on Feb. 6, 2015, both of which are incorporated herein by reference in their entirety.

TECHNICAL FIELD

Embodiments relate to the field of Internet technology and, more particularly, to identifying virus variants.

BACKGROUND

Owing to the popularization of Internet technology and smart devices, the Android platform has quickly grown to become the smart device operating system with the largest market share because it is free and open source. However, safety issues including, but not limited to, malwares, worms, Trojans, and botnets are emerging. Developments have been made in combating antivirus technology by those who develop and transmit viruses, including but not limited to, modifying condition codes, using Java reflection call mechanisms, character string decoding technology, as well as fine tuning-function call structure. This creates a large number of virus variants, thereby leading to inefficiency in the detection and removal of the viruses.

The antivirus software under the Android platform usually uses the technique of identifying condition codes to detect and remove viruses. However, those who develop and transmit viruses keep developing techniques to make viruses non-detectable. For example, they use mechanisms such as ProGuard, which mixes feature information of virus programs such as virus class names, function names, and constant strings, to mix the information carried by viruses and make the current antivirus software incapable of detecting and removing viruses and their variants.

SUMMARY OF THE INVENTION

Embodiments according to the disclosure provide the identifying of computer virus variants to improve the accuracy of detecting and removing viruses. The present disclosure overcomes the deficiencies explained above by providing techniques for identifying virus variants by a dynamic detecting mechanism, which improves the accuracy of detecting virus variants, as well as enlarges the applicable range of the techniques for detecting and removing viruses. Regardless of whether or not the identity of the virus sample to be tested has been masked by technical means, virus variants may be accurately detected. The dynamic detection mechanism vastly increases the application scope of virus identification and removal technology and greatly improves the virus recall ratio.

An embodiment of the present disclosure includes a process to identify virus variants, where the process runs or operates a virus sample to be tested and records an application program interface (API) call sequence produced during the running of the virus sample. Also, a plurality of characteristic API call sequences that respectively correspond to a plurality of virus families are obtained, where each characteristic API call sequence represents the behavior that characterizes the corresponding virus family. The API call sequence produced by running the virus sample to be tested is matched with the plurality of characteristic API call sequences to obtain matching results. Based on the matching results, it is determined whether the virus sample is a type of virus variant by the extent of a match between the API call sequence of the virus sample and at least one of the plurality of characteristic API call sequences that respectively correspond to the plurality of virus families.

An embodiment of the present disclosure includes an apparatus for identifying virus variants, where the apparatus includes an execution unit, a matching unit, and a recognition unit. The execution unit runs or operates the virus sample to be tested and records an API call sequence produced during the running of the virus sample. The matching unit obtains a plurality of characteristic API call sequences that respectively correspond to a plurality of virus families, where each characteristic API call sequence represents the behavior that characterizes the corresponding virus family. Also, the matching unit matches the API call sequence of the virus sample with the plurality of characteristic API call sequences to obtain a matching result. The recognition unit determines whether the virus sample is a virus variant by the extent of a match between the API call sequence of the virus sample and at least one of the plurality of characteristic API call sequences that respectively correspond to the plurality of virus families.

The present disclosure takes the plurality of characteristic API call sequences that respectively correspond to the plurality of virus families as references to monitor the API calls during the running of the virus sample to be tested. As long as there is a match to some extent between the API call sequence of the virus sample and at least one of the plurality of characteristic API call sequences that respectively correspond to the plurality of virus families, regardless of whether or not the identity of the virus sample to be tested is concealed, the virus sample to be tested may be or possibly be considered to be a virus variant. This dynamic detecting mechanism provides accurate detection of virus variants and expands the applicable range of identification and detection techniques that improve the recall ratio of viruses and decrease the rate of virus manslaughters. The detectable viruses that are referred to in the present disclosure include, but are not limited to, malwares, worms, Trojans, or botnets. Also, the applicable scope of the present disclosure includes, but is not limited to, virus variant techniques aimed at modifying a condition code of a virus.

BRIEF DESCRIPTION OF THE DRAWINGS

Embodiments according to the present disclosure will be better understood from a reading of the following detailed description, taken in conjunction with the accompanying figures, in which like reference characters designate like elements.

DETAILED DESCRIPTION

Reference will now be made in detail to the embodiments of the present disclosure. While the disclosure will be described in conjunction with these embodiments, it will be understood that they are not intended to limit the disclosure to these embodiments. On the contrary, the disclosure is intended to cover alternatives, modifications, and equivalents which may be included within the spirit and scope of the appended claims.

Furthermore, in the following detailed description of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail so as not to unnecessarily obscure aspects of the present disclosure.

In order to improve the accuracy for detecting and removing viruses, the present disclosure provides a method that identifies virus variants using simulation techniques. This method expands the applicable range for detecting and removing viruses, improves the detection rate, and decreases the rate of virus manslaughters.

In an embodiment, at a preprocessing stage, a feature library of characteristic API call sequences for a plurality of virus families is established to provide information of characteristic API call sequences for identifying virus variants in subsequent stages, where each characteristic API call sequence represents the behavior that characterizes the corresponding virus family. First, at the preprocessing stage, an Android simulation environment is called to pile and mark key APIs in a system. APIs are a set of defined functions designed to provide access to a set of routines based on certain software or hardware, with no need to access the source code for an application program. APIs also assist in understanding the details of how components interact in a program. Piling is performed to record key information of every key API at its spot, such as the calling party of an API, the API name, the API class name, etc. Since a virus or a virus variant usually calls a few key APIs during operation to implement the virus vandalism, the APIs that possess important impact may be marked as key APIs based on past development experience so that they can be used when identifying viruses and virus variants. Specifically, an Android simulator is created to pile and mark the APIs called by the system in the framework or the native layer of the Android system. The Android simulator can record and call data such as the user identification of the program.

There is a feature library of characteristic API call sequences established by recording API types and API call orders called during the running of virus samples of the plurality of virus families to generate a characteristic API call sequence for each one of the virus families. It is appreciated that, in applications, the malicious behaviors of a certain virus family during operation are similar, which means that the behaviors of calling APIs are similar for the same virus family. A virus family is composed of a series of viruses that share the same source. Therefore, based on a virus sample of a virus family, the same characteristic API call sequence that viruses in the same virus family call can be identified and extracted to generate a feature library of characteristic API call sequences that respectively correspond to the plurality of virus families. In the present disclosure, the API call sequence a virus family shares will be referred to as the characteristic API call sequence of that virus family.

When running a virus sample of a virus family, the framework logic of the Android simulator may be modified to avoid the wait for the occurrence of a physical triggering event that activates the viruses in the virus family. Instead, the system periodically sends different kinds of simulated self-activated events that are used to trigger the running of the virus sample of the virus family. For example, if the physical triggering event that the virus family "A" depends on is "system activation," then during the running process of the system, instead of restarting the system during its operation, the simulated self-activation will be programmed periodically to activate "system activation" to indicate to the virus sample of the virus family "A" that its triggering condition has been met and its operation may be initiated.

Furthermore, when a known virus sample of a virus family is operating on the Android simulator, the user's operating environment, such as a mobile phone operating environment and personal computer operating environment, may be simulated using "Monkey" and "UI Automator" modules. "Monkey" is a tool to test an Android application package on the Android system automatically. "UI Animator" is a framework that is used on the Android system to conduct automated tests. Users may use the logic of the framework "UI Automator" to write a test case of a certain Android application package. For example, assuming that there are virus variants a1, a2, and a3 in virus family A, the virus variant a1 has called API1, API2, API3, and API4 during operation; the virus variant a2 has called API1, API3, API5, and API6; and the virus variant a3 has called API2, API3, API6, and API7.

In the example above, all three virus variants have called API3 and two virus variants have called API1 and API2. Therefore, the call rates of these three APIs exceed a preset threshold, if the preset threshold is assumed to be 50%. Then, the final choice of the characteristic API call sequence of virus family A may be determined as API1, API2, and API3. When recording the characteristic API call sequences for virus families, the call order of the APIs may or may not be recorded depending on the application environment.

Based on the characteristic API call sequence generated for each virus family, a feature library of characteristic API call sequences may be established and used to provide characteristic API call sequences any time in the subsequent stages. After the establishment of a characteristic API call sequence for each one of the virus families, a key API call sequence for each one of the virus families may be selected from the characteristic API call sequences that respectively correspond to the plurality of virus families. The key API call sequences may be stored in the feature library as well. The key API call sequence of each one of the virus families includes the selected key APIs that have been piled and marked from the corresponding characteristic API call sequences. Those key APIs correspond to key operations in the system, such as self-activation, connecting to Internet, obtaining private data, sending text messages, etc.

Figure 1:
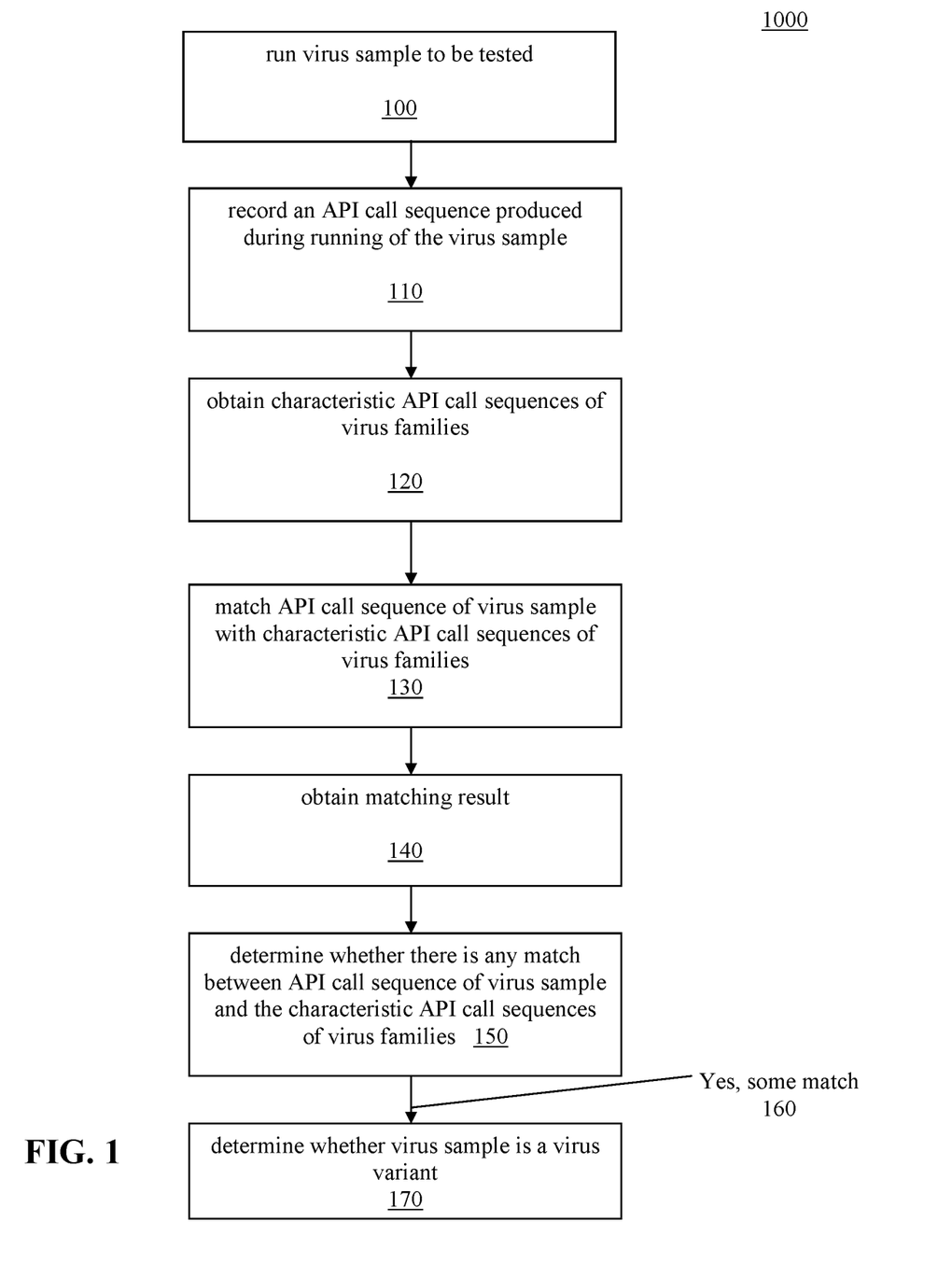
FIG. 1 illustrates a flowchart of a method of identifying virus variants in accordance with an embodiment of the present disclosure.

FIG. 1 illustrates a method 1000 of identifying virus variants in accordance with an embodiment of the present disclosure. In Step 100, a virus sample to be tested starts to run. In Step 110, an API call sequence produced by the virus sample during the running of the virus sample is recorded.

In applications, there may be a single virus sample to be tested or a group of virus samples to be tested. Since the detection process is similar for every virus sample to be tested, the present disclosure will discuss the case of a single virus sample to be tested, as an example.

Specifically, when running or operating the virus sample to be tested, an API call sequence is generated in accordance with the API type and call order called during the operation of the virus sample to be tested. When running the virus sample to be tested, the framework logic of the Android simulator may be modified in order to avoid the wait time for the occurrence of a certain physical triggering event that activates the virus sample during the operation of the virus sample. Instead, the system sends different kinds of simulated self-activated events periodically to automatically trigger the activation of viruses in the virus families to be tested. For example, if the physical triggering event that activates the operating of viruses in the virus families to be tested relies on is "a user sends a text massage," during the operating of the system, instead of sending the text messages regularly, the system periodically simulates a self-activating event "sending text message." This indicates to the virus sample to be tested that the requirements to trigger its activation have been met and the operating of the virus sample may be initiated. Furthermore, when the virus sample to be tested is running on the Android simulator, the user operating environment, such as a mobile phone environment and a personal computer environment, may be simulated by using "Monkey" and "UI Automator" modules.

In Step 120, a characteristic API call sequence is obtained for each one of the virus families. As explained above, the feature library includes a plurality of characteristic API call sequences that respectively correspond to a plurality of virus families, where each characteristic API call sequence represents the behavior that characterizes the corresponding virus family. In Step 130, in a first matching procedure, the API call sequence produced by the virus sample to be tested during its operation is matched with the characteristic API call sequences of the virus families. In Step 140, the matching result is obtained. Specifically, the generated characteristic API call sequences that respectively correspond to each one of the virus families may be obtained from the feature library of the characteristic API call sequence that has been generated in the preprocessing stage. Then, the API call sequence of the virus sample may be matched with each one of the characteristic API call sequences of the virus families.

Since the API call sequence of the virus sample to be tested may require large amount of resources to accomplish the testing in some applications, in order to improve the efficiency of matching the API call sequence of the virus sample to be tested with the characteristic API call sequences of the virus families, a string matching algorithm may be adopted. The string matching algorithm may be used to determine whether there is at least one API timing sequence in the API call sequence path of the virus sample that matches to an extent at least one of the characteristic API call sequences of the virus families. Depending on the extent of the match, the virus sample to be tested may be or possibly be considered to be a virus variant of the virus families.

String matching algorithm is an exemplary matching algorithm used in the present disclosure. For example, assuming a call path of a function has a series of virus features "P:p1p2p3p4" and assuming a call path of a function "T:t1t2t3t4t5t6t7t8t9" is obtained after the operation of a virus sample. In order to compare these two call paths using the string matching algorithm, it may be determined whether there is a "p1p2p3p4" call path in the call path "t1t2t3t4t5t6t7t8t9." The simplest way to perform the matching is first to compare "t1" and "p1" to determine if "t1" and "p1" are equivalent. If they are equivalent, then compare "t2" and "p2" to determine if "t2" and "p2" are equivalent. If "t1" and "p1" are not equivalent, compare "t2" with "p1" to determine if "t2" with "p1" are equivalent. Using the same analogy, the comparisons between each one of the components in the call paths may be conducted using the string matching algorithm until rest of the components in the call paths are compared.

Examples of classic algorithms in the family of string matching algorithms include the Knuth-Morris-Pratt algorithm and the Boyer-Moore algorithm.

Taking call sequence "1" in a characteristic API call sequence of a virus family as an example, in the process of matching, the operations that can be conducted include, but are not limited to the following operations: determining a first API type and API call order called when operating the characteristic API call sequence "1" of the virus family and determining a second API type and API call order called when operating the API call sequence of the virus sample to be tested. Once the first and the second API types and API call orders are determined, the matching rate between the first and second API types and API call orders may be calculated using an algorithm including, but not limited to, a string matching algorithm. If the matching rate reaches a first set limit (e.g., 80%) for at least one of the characteristic API call sequences of virus families, it may be determined that the matching is complete and successful.

Furthermore, if the matching rate between the first and the second API types and API call orders does not reach the first set limit, a key API call sequence "1" that corresponds to the characteristic API call sequence "1" of the virus family may be selected from the feature library of characteristic API call sequences configured in the preprocessing stage. The key API call sequence "1" includes the key APIs that are appointed and selected from the characteristic API call sequence, which are also interpreted as the piled and marked APIs in the preprocessing stage. In an embodiment, the key API is appointed in advance and is able to influence the safe operation of the system.

In the second matching procedure, the next step is to determine a third API type and API call order when operating the key API call sequence "1" and to calculate the matching rate between the second and third API types and API call orders. If the matching rate between the second and third API types and API call orders reaches a second set limit, it may be determined that the matching is complete and successful. The API call sequence of the virus sample to be tested may also be matched with the key API call sequences of one or more of the characteristic API call sequences of the virus families. Alternatively, the matching result may be presented to a client or a user that sent the virus sample. Based on a feedback from the client or the user, it may be determined whether the matching is complete and successful.

An operation to record the key API call sequences of each one of the virus families in addition to the characteristic API call sequences of each one of the virus families recorded in the feature library of API sequences exists. Even if the API call sequence of the virus sample to be tested recorded during the operating of the virus sample to be tested does not match to a certain extent any one of the characteristic API call sequences of the any one of the virus families on the record, it may not be concluded that there is no possibility that the virus sample is not a virus variant. In fact, it indicates the possibility that the virus sample is a new type of virus variant. This is possible because there is great variation in the API type and API call order of this virus sample compared to the characteristic API call sequences of the virus families, causing the API call sequence of the virus sample to not match to a certain extent any of the characteristic API call sequences of the existing virus families.

In order to avoid non-detection of a virus variant, at the point where there is not a match to a certain extent between the API call sequence of the virus sample and any of the characteristic API call sequences of the virus families on record, a supplemental matching may be performed. In the supplemental matching, matching between the API call sequence of the virus sample and the key API call sequences of each one of the virus families is accomplished. This supplemental matching may also be referred as approximate string matching or fuzzy string searching. In this supplemental matching, if there is a certain key API called during the executing or running of the API call sequence of the virus sample and the call order of this key API is similar to a characteristic API call sequence of one of the virus families, or the matching rate between the API call sequence of the virus sample and the characteristic API call sequence of one of the virus families reaches a limit, it may be determined that the matching is complete and successful and that the virus sample may be considered as a new type of virus variant. A more accurate result may be obtained by returning the virus sample to the sender (e.g., administrator) with a notice that it is possible that the virus sample is a new type of virus variant and that a confirmation is requested. When a feedback from the administrator is received, whether or not the virus sample is a new type of virus variant may be recorded in accordance with the instructions from the administrator.

In Step 150, it is determined whether the matching between the API call sequence of the virus sample and the characteristic API call sequences of the virus families is complete and successful. In Step 160, it is determined that the matching is complete and successful. Continuing, in Step 170, the virus sample to be tested may be determined to be a virus variant depending on the extent of a match between the API call sequence of the virus sample and at least one of the plurality of characteristic API call sequences of the virus families.

When the virus sample is determined to be a virus variant, the API call sequence of this virus sample (or new virus variant) may be recorded and included in the feature library of characteristic API call sequences. Also, a key API call sequence for the virus sample (or new virus variant) is also selected from the API call sequence of this virus sample (or new virus variant) to be recorded in the feature library of characteristic API call sequences. In this way, the feature library of characteristic API sequences keeps updating according to the matching results of the continuous matching processes to ensure that its data is up to date and effective.

Figure 2:
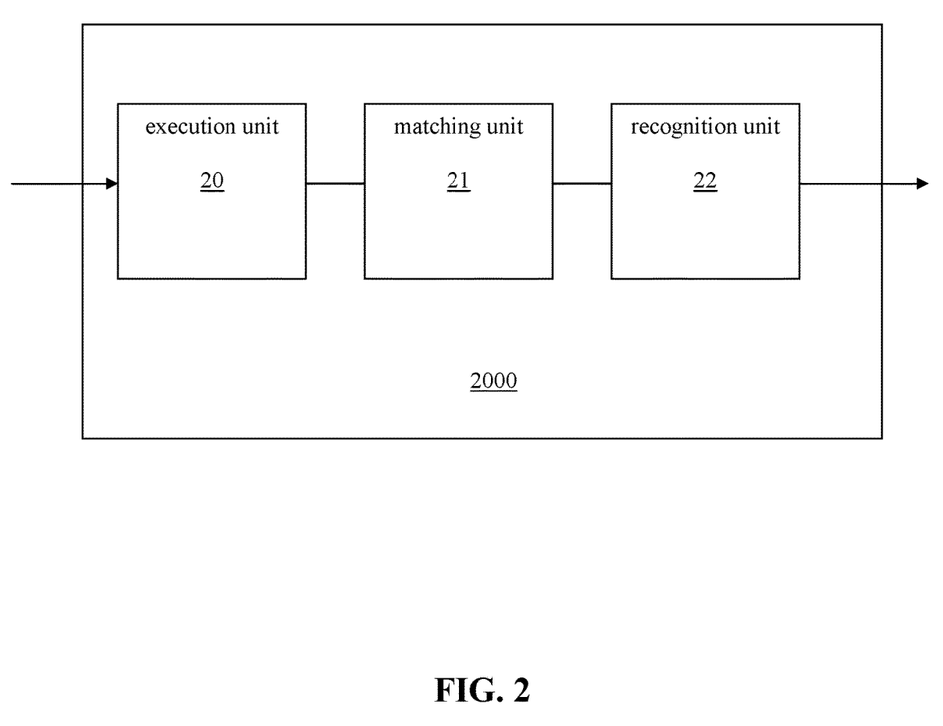
FIG. 2 illustrates a block diagram of an apparatus for identifying virus variants in accordance with an embodiment of the present disclosure.

FIG. 2 illustrates an apparatus 2000 for identifying virus variants in accordance with an embodiment. The apparatus 2000 includes an execution unit 20, a matching unit 21 coupled to the execution unit 20, and a recognition unit 22 coupled to the matching unit 21. In an embodiment, the execution unit 20, the matching unit 21, and the recognition unit 22 are implemented in a computer (e.g., 3000 FIG. 3) including a memory that is accessible by a processor and/or a GPU (graphics processor unit). In an embodiment, the execution unit 20, the matching unit 21, and the recognition unit 22 are computer-executable instructions stored in the memory of a computer (e.g., 3000 FIG. 3), where the computer-executable instructions are executed by a processor and/or a GPU. The execution unit 20 runs a virus sample to be tested and records an API call sequence produced during the running of the virus sample. Further, the matching unit 21 obtains a characteristic API call sequence of each one of the virus families and matches the API call sequence produced by the virus sample during running with each one of the characteristic API call sequences of each one of the virus families to obtain a matching result. The plurality of characteristic API call sequences that respectively correspond to the plurality of virus families are obtained, where each characteristic API call sequence represents the behavior that characterizes the corresponding virus family. The recognition unit 22 determines, based on the analysis of the matching result, whether the virus sample to be tested is virus variant by extent of a match between the API call sequence of the virus sample to be tested and any one of the characteristic API call sequences of any one of the virus families.

The execution unit 20 may further run a set of virus samples of the virus families and record API types and API call orders called during the running of the set of virus samples to generate the characteristic API call sequences for each one of the virus families in order to establish a feature library of characteristic API call sequences. The execution unit 20 may also simulate a physical triggering event that activates the running of a virus according to a set interval during the process of running the virus sample to be tested and the running of the set of virus samples.

When it is determined that there is a match to a certain extent between the API call sequence of the virus sample to be tested and any of the characteristic API call sequences of any of the virus families based on the matching result, the matching unit 21 may further determine a first API type and API call order called when running any of the characteristic API call sequences of any of the virus families. Also, the matching unit 21 may further determine a second API type and API call order called for the sample virus based on the API call sequence. Then, the matching rate between the first and the second API types and API call orders may be calculated by the matching unit 21.

The recognition unit 22 may further determine whether the API call sequence of the virus sample to be tested matches any of the characteristic API call sequences of any of the virus families by the matching rate meeting a first set limit.

The matching unit 21 may further obtain a key API call sequence of any of the virus families and determine a third API type and API call order called based on the key API call sequence during running of the virus family when a notice is received from the recognition unit 22 carrying a message indicating that the matching rate of the first and second API types and API call orders does not meet the first set limit. The key API call sequence includes the appointed key API selected from the characteristic API call sequences of any of the virus families. In an embodiment, the key API is preset and is able to influence the safe operation of the system. Then, a second matching rate between the second and third API types and API call orders may be calculated by the matching unit 21.

The recognition unit 22 may further determine whether the API call sequence of the virus sample matches the key API call sequence by determining whether the second matching rate meets a second set limit. The matching is between the second and the third API types and API call orders. Also, the recognition unit 22 may present the matching result to a client or a user that sent the virus sample and may determine whether the API call sequence of the virus sample matches the key API call sequence based on a feedback from the client or the user (or the sender). The calculation may be conducted using a string matching algorithm in an embodiment.

Figure 3:
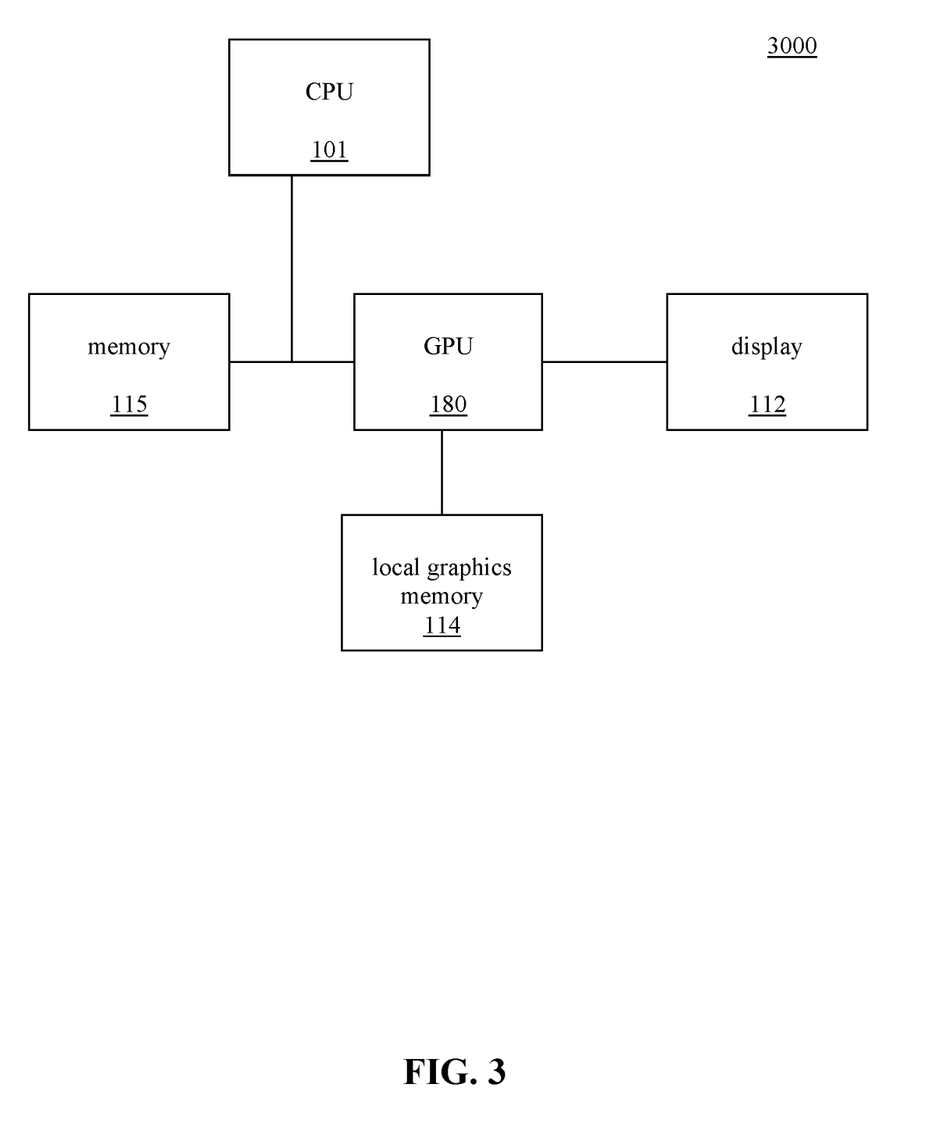
FIG. 3 illustrates a computer system in accordance with one embodiment of the present disclosure.

FIG. 3 shows a computer system 3000 in accordance with one embodiment of the present disclosure. Computer system 3000 depicts the components of a basic computer system in accordance with embodiments of the present disclosure providing the execution platform for certain hardware-based and software-based functionality. In general, computer system 3000 comprises at least one CPU 101, a system memory 115, and at least one graphics processor unit (GPU) 180. The CPU 101 can be coupled to the system memory 115 via a bridge component/memory controller (not shown) or can be directly coupled to the system memory 115 via a memory controller (not shown) internal to the CPU 101. The GPU 180 is coupled to a display 112. One or more additional GPUs can optionally be coupled to system 3000 to further increase its computational power. The GPU(s) 180 is coupled to the CPU 101 and the system memory 115. System 3000 can be implemented as, for example, a desktop computer system or server computer system, having a powerful general-purpose CPU 101 coupled to a dedicated graphics rendering GPU 180. In such an embodiment, components can be included that add peripheral buses, specialized graphics memory, IO devices, and the like. Similarly, system 3000 can be implemented as a handheld device (e.g., cellphone, etc.) or a set-top video game console device.

It should be appreciated that the GPU 180 can be implemented as a discrete component, a discrete graphics card designed to couple to the computer system 3000 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 180 for high bandwidth graphics data storage.

In the embodiments discussed above, the call states of the characteristic API call sequences of the virus families are set as references to monitor the call states of the API call sequences produced during running of virus sample to be tested. Regardless of whether the identification of the virus sample is covered by certain techniques or not, as long as the call state of the API call sequence produced during running of the virus sample matches to an extent the call state of any of the characteristic API call sequences of any of the virus families, the virus sample may be or possibly be considered to be a virus variant in the virus family corresponding with that characteristic API call sequence to which it matches to an extent. Thus, the detection of a virus variant is more accurate. By using a dynamic detecting mechanism, the applicable range of the identification and detection techniques is expanded and the recall ratio is improved. The detectable viruses include, but are not limited to, malwares, worms, Trojans, or botnets. The applicable scope of the present disclosure includes, but is not limited to, virus variants techniques such as modifying condition codes, etc.

Those skilled in the art should appreciate that the present disclosure may be provided in the forms of methods, systems, or computer program products. Therefore, the present disclosure may be embodied as an entirely hardware embodiment, entirely software embodiment, or a combination of a hardware and software embodiment. Moreover, the present disclosure may be used in the forms of computer programmable products that adopt one or multiple computer usable storage mediums including, but not limited to, magnetic storage disks, CD-ROMs, or optical storage containing computer usable program codes.

The present disclosure is presented based on flow diagrams and/or block diagrams of methods, devices or systems, and computer program products of the embodiments of the present disclosure. It should be understood that each one of the steps and/or blocks in the flow diagrams and/or block diagrams as well as the combinations between each one of the steps/blocks in the flow and/or block diagrams may be embodied by computer program instructions. The computer program instructions may be provided for by general purpose computers, dedicated computers, embedded matching units, or other matching units of programmable data processing devices to generate a device that embodies, by computers, or matching units of other programmable data processing devices executing instructions, appointed functions in one or multiple steps in the flow diagrams and/or one or multiple blocks in the block diagrams.

These computer instructions may also be stored in computer readable storage mediums that guide computers or other matching units of programmable data processing devices and work in a specified manner to have the instructions that are stored in the computer readable storage mediums produce results. The devices implement functions in one or multiple steps in the flow diagrams and/or one or multiple blocks in the block diagrams.

These computer program instructions may also be loaded to computers or other programmable data processing devices to produce computer embodied processing by executing a series of operations on computers or other programmable data processing devices to provide, on computers or other programmable data processing devices, steps to embody appointed functions that can be embodied in one or multiple steps in the flow diagrams and/or one or multiple blocks in the block diagrams.

The following examples pertain to specific technology embodiments and point out specific features, elements, or steps that may be used or otherwise combined in achieving such embodiments.

Example 1 includes a method of identifying computer virus variants, the method comprising: running a virus sample to be tested; recording an API (Application Program Interface) call sequence produced during the running of the virus sample; obtaining a plurality of characteristic API call sequences that respectively correspond to a plurality of virus families; matching the API call sequence with the plurality of characteristic API call sequences to obtain a matching result; and based on the matching result, determining whether the virus sample is a virus variant by extent of a match between the API call sequence and at least one of the plurality of characteristic API call sequences.

Example 2 includes the method of Example 1, further comprising: running a set of virus samples of the plurality of virus families; recording an API type and an API call order called in each one of the plurality of virus families during the running of the set of virus samples; generating the plurality of characteristic API call sequences by using the recorded API type and the recorded API call order; and establishing a feature library of the plurality of characteristic API call sequences.

Example 3 includes the method of Example 2, further comprising: simulating a physical triggering event that is used to activate the running of a virus according to a set period during the running of the virus sample and the running of the set of virus samples.

Example 4 includes the method of Example 2, wherein, based on the matching result, the API call sequence of the virus sample matches to an extent at least one of the plurality of characteristic API call sequences that respectively correspond to the plurality of virus families, further comprising: determining a first API type and API call order called for each one of the plurality of virus families; determining a second API type and API call order called for the virus sample; for each one of the plurality of virus families, calculating a matching rate between the first and the second API types and API call orders; and determining the API call sequence of the virus sample matches at least one of the plurality of characteristic API call sequences by the matching rate meeting a first set limit.

Example 5 includes method of Example 4, wherein the matching rate does not meet the first set limit, further comprising: obtaining a key API call sequence of at least one of the plurality of virus families; determining a third API type and API call order called for the at least one of the plurality of virus families by using the key API call sequence, wherein the key API call sequence includes a key API selected from a characteristic API call sequence that respectively corresponds to the at least one of the plurality of virus families, and wherein the key API is preset and able to affect safe operation of a system; and generating a second matching result by calculating a second matching rate between the second and the third API types and API call orders.

Example 6 includes the method of Example 5, further comprising: determining whether the API call sequence of the virus sample matches the key API call sequence by determining whether the second matching rate meets a second set limit.

Example 7 includes the method of Example 5, further comprising: presenting the second matching result to a sender of the virus sample; and determining whether the API call sequence of the virus sample matches the key API call sequence based on a feedback from the sender.

Example 8 includes the method of Example 7, wherein the sender includes a client.

Example 9 includes the method of Example 4, wherein the calculating the matching rate comprises: using a string matching algorithm.

Example 10 includes a computer for identifying computer virus variants, comprising: a processor; and a memory comprising: an execution unit configured to run a virus sample to be tested and to record an API call sequence produced during the running of the virus sample; a matching unit coupled to the execution unit and configured to obtain a plurality of characteristic API call sequences that respectively correspond to a plurality of virus families, to match the API call sequence with the plurality of characteristic API call sequences, and to obtain a matching result; and a recognition unit coupled to the matching unit and configured, based on the matching result, to determine whether the virus sample is a virus variant by extent of a match between the API call sequence and at least one of the plurality of characteristic API call sequences.

Example 11 includes the computer of Example 10, wherein the execution unit is further configured: to run a set of virus samples of the plurality of virus families; to record an API type and API call order called during the running of the set of virus samples; to generate the plurality of characteristic API call sequences by using the recorded API type and the recorded API call order, and to establish a feature library of the plurality of characteristic API call sequences.

Example 12 includes the computer of Example 11, wherein the execution unit is further configured to simulate a physical triggering event that is used to activate the running of a virus during the running of the virus sample and the running of the set of virus samples.

Example 13 includes the computer of Example 11, wherein, based on the matching result, the API call sequence of the virus sample matches to an extent at least one of the plurality of characteristic API call sequences that respectively correspond to the plurality of virus families, wherein the matching unit is further configured to: determine a first API type and API call order called for each one of the plurality of virus families; determine a second API type and API call order called for the virus sample; for each one of the plurality of virus families, calculate a matching rate between the first and the second API types and API call orders; and wherein the recognition unit is further configured to determine the API call sequence of the virus sample matches at least one of the plurality of characteristic API call sequences by the matching rate meeting a first set limit.

Example 14 includes the computer of Example 13, wherein the matching rate does not meet the first set limit in accordance with a notice produced by the recognition unit, wherein the matching unit is further configured to: obtain a key API call sequence of at least one of the plurality of virus families; determine a third API type and API call order called for the at least one of the plurality of virus families by using the key API call sequence, wherein the key API call sequence includes a key API selected from a characteristic API call sequence that respectively corresponds to the at least one of the plurality of virus families, wherein the key API is preset and able to affect safe operation of a system; and generate a second matching result by calculating a second matching rate between the second and the third API types and API call orders.

Example 15 includes the computer of Example 14, wherein the recognition unit is further configured to determine whether the API call sequence of the virus sample matches the key API call sequence by determining whether the second matching rate meets a second set limit.

Example 16 include the computer of Example 14, wherein the recognition unit is further configured to present the second matching result to a sender of the virus sample and to determine whether the API call sequence of the virus sample matches the key API call sequence based on a feedback from the sender.

Example 17 includes the computer of Example 16, wherein the sender includes a client.

Example 18 includes the computer of Example 13, wherein the matching unit is further configured to calculate the matching rate by using a string matching algorithm.

Example 19 includes a method of identifying computer virus variants, the method comprising: performing a first matching procedure between an API call sequence of a virus sample and a plurality of characteristic API call sequences that respectively correspond to a plurality of virus families to generate a first matching result including a first matching rate; and if the first matching rate does not meet a first set limit, performing a second matching procedure between the API call sequence of the virus sample and a key API call sequence of at least one of the plurality of virus families to generate a second matching result including a second matching rate; and using at least one of the first matching result or the second matching result to determine whether the virus sample is a virus variant.

Example 20 includes the method of Example 19, further comprising: calculating at least one of the first matching result or the second matching result by using a string matching algorithm.

Example 21 includes a method of identifying computer virus variants, the method comprising: naming a virus sample to be tested; generating and recording a sample application program interface (API) call sequence that represents runtime characteristic behavior performed by the sample produced during the running of the virus sample; obtaining a plurality of characteristic API call sequences and a plurality of key API call sequences, the plurality of characteristic API call sequences respectively correspond to and respectively represent runtime characteristic behavior performed by a plurality of virus families, each characteristic API call sequence having a corresponding key API call sequence in the plurality of key API call sequences, wherein each of the corresponding API call sequences comprise API calls that represent impactful key APIs used in operation by a respective virus family of the plurality of virus families; for each of the plurality of characteristic API call sequences, determining a number of characteristic API calls that are in the sample API call sequence: when the number of characteristic API calls that are in the sample API call sequence reaches a first set limit, generating an indication that the virus sample is likely virus; when the number of characteristic API calls that are in the sample API call sequence lies below the first set limit, for each of the plurality of key API call sequences, determining a number of key API calls that are in the sample API call sequence; and when the number of key API calls that are in the sample API call sequence reaches a second set limit, generating an indication that the virus sample may be a virus.

Example 22 includes the method of Example 21, further comprising: running a set of virus samples of the plurality of virus families; recording an API type and an API call order called in each one of the plurality of virus families during the running of the set of virus samples; generating the plurality of characteristic API call sequences by using the recorded API type and the recorded API call order; and establishing a feature library of the plurality of characteristic API call sequences.

Example 23 includes the method of Example 21, wherein: obtaining a plurality of characteristic API call sequences includes determining a first API type and API call order called for each one of the plurality of virus families; generating and recording a sample API call sequence includes determining a second API type and API call order called for the virus sample; determining a number of characteristic API calls that are in the sample API call sequence includes calculating a matching rate between the first and the second API types and API call orders.

Example 24 include a method of identifying computer virus variants, the method comprising: running a virus sample to be tested; recording an application program interface (API) call sequence that represents runtime characteristic behavior performed by the virus sample produced during the running of the virus sample; obtaining a plurality of characteristic API call sequences that respectively correspond to and respectively represent runtime characteristic behavior performed by a plurality of virus families; running a set of virus samples of the plurality of virus families; recording an API type and an API call order called in each one of the plurality of virus families during the running of the set of virus samples; generating the plurality of characteristic API call sequences by using the recorded API type and the recorded API call order; establishing a feature library of the plurality of characteristic API call sequences; matching the API call sequence with the plurality of characteristic API call sequences to obtain a matching result; based on the matching result not satisfying a threshold, matching the API call sequence with a plurality of pre-selected sequence portions that are respectively from the plurality of characteristic API call sequences to obtain other matching result; and determining whether the virus sample is a virus variant by extent of the matching result indicates match between the API call sequence and at least one of the plurality of characteristic API call sequences and, if the matching result does not satisfy the threshold, by extent of the other matching result indicates match between the API call sequence and at least one of the plurality of pre-selected sequence portions, wherein the API call sequence, the characteristic API call sequences, and the pre-selected sequence portions are created from performed runtime behavior; wherein: based on the matching result, the API call sequence of the virus sample matches to an extent at least one of the plurality of characteristic API call sequences that respectively correspond to the plurality of virus families, further comprising: determining a first API type and API call order called for each one of the plurality of virus families; determining a second API type and API call order called for the virus sample; for each one of the plurality of virus families, calculating a matching rate between the first and the second API types and API call orders; determining the API call sequence of the virus sample matches at least one of the plurality of characteristic API call sequences by the matching rate meeting a first set limit; the matching rate does not meet the first set limit, further comprising, obtaining a key API call sequence of at least one of the plurality of virus families; determining a third API type and API call order called for the at least one of the plurality of virus families by using the key API call sequence, wherein the key API call sequence includes a key API selected from a characteristic API call sequence that respectively corresponds to the at least one of the plurality of virus families, and wherein the key API is preset and able to affect safe operation of a system; and generating a second matching result by calculating a second matching rate between the second and the third API types and API call orders.

Example 25 includes a computer for identifying computer virus variants, comprising: a memory, a processor coupled to the memory, the processor to: run a virus sample to be tested and to record an application program interface (API) call sequence that represents runtime characteristic behavior performed by the virus sample produced during the running of the virus sample; obtain a plurality of characteristic API call sequences and a plurality of key API call sequences, the plurality of characteristic API call sequences respectively correspond to and respectively represent runtime characteristic behavior performed by a plurality of virus families, each characteristic API call sequence having a corresponding key API call sequence in the plurality of key API call sequences, wherein each of the corresponding key API call sequences comprises API calls that represent impactful key APIs used in operation by a respective virus family of the plurality of virus families; for each of the plurality of characteristic API call sequences, determine a number of characteristic API calls that are in the sample API call sequence; when the number of characteristic API calls that are in the sample API call sequence reaches a first set limit, generate an indication that the virus sample is likely virus; when the number of characteristic API calls that are in the sample API call sequence lies below the first set limit, for each of the plurality of key API call sequences, determine a number of key API calls that are in the sample API call sequence; and when the number of key API calls that are in the sample API call sequence reaches a second set limit, generate an indication that the virus sample may be a virus.

Example 26 includes the computer of Example 25, wherein the processor to further: run a set of virus samples of the plurality of virus families; record an API type and API call order called during the running of the set of virus samples; generate the plurality of characteristic API call sequences by using the recorded API type and the recorded API call order; and establish a feature library of the plurality of characteristic API call sequences.

Example 27 includes the computer of Example 26, wherein: obtaining a plurality of characteristic API call sequences includes determining a first API type and API call order called for each one of the plurality of virus families; generating and recording a sample API call sequence includes determining a second API type and API call order called for the virus sample; determining a number of characteristic API calls that are in the sample API call sequence includes calculating a matching rate between the first and the second API types and API call orders.

Example 28 includes a computer for identifying computer virus variants, comprising: a memory; a processor coupled to the memory, the processor to: run a virus sample to be tested and record an application program interface (API) call sequence that represents runtime characteristic behavior performed by the virus sample produced during the running of the virus sample; obtain a plurality of characteristic API call sequences that respectively correspond to and respectively represent runtime characteristic behavior performed by a plurality of virus families, to match the API call sequence with the plurality of characteristic API call sequences to obtain a matching result, and, if the matching result does not satisfy a threshold, to match the API call sequence with a plurality of pre-selected sequence portions that are respectively from the plurality of characteristic API call sequences to obtain other matching result: run a set of virus samples of the plurality of virus families; record an API type and API call order called during the running of the set of virus samples; generate the plurality of characteristic API call sequences by using the recorded API type and the recorded API call order; establish a feature library of the plurality of characteristic API call sequences; and determine whether the virus sample is a virus variant by extent of the matching result indicates match between the API call sequence and at least one of the plurality of characteristic API call sequences and, if the matching result does not satisfy the threshold, by extent of the other matching result indicates match between the API call sequence and at least one of the plurality of pre-selected sequence portions, wherein the API call sequence, the characteristic API call sequences, and the pre-selected sequence portions are created from performed runtime behavior; wherein: based on the matching result, the API call sequence of the virus sample matches to an extent at least one of the plurality of characteristic API call sequences that respectively correspond to the plurality of virus families, wherein the processor to further: determine a first API type and API call order called for each one of the plurality of virus families; determine a second API type and API call order called for the virus sample; for each one of the plurality of virus families, calculate a matching rate between the first and the second API types and API call orders; and wherein the processor to further determine the API call sequence of the virus sample matches at least one of the plurality of characteristic API call sequences by the matching rate meeting a first set limit; the matching rate does not meet the first set limit in accordance with a notice, wherein the processor to further: obtain a key API call sequence of at least one of the plurality of virus families; determine a third API type and API call order called for the at least one of the plurality of virus families by using the key API call sequence, wherein the key API call sequence includes a key API selected from a characteristic API call sequence that respectively corresponds to the at least one of the plurality of virus families, wherein the key API is preset and able to affect safe operation of a system; and generate a second matching result by calculating a second matching rate between the second and the third API types and API call orders.

Example 29 includes a non-transitory computer-readable medium operably coupled to the processor, the non-transitory computer-readable medium having computer-readable instructions stored thereon which, when executed by the processor, cause the processor to execute a method of allocating computer resources, the method comprising: running a virus sample to be tested; generating and recording a sample application program interface (API) call sequence that represents runtime characteristic behavior performed by the virus sample produced during the running of the virus sample; obtaining a plurality of characteristic API call sequences and a plurality of key API call sequences, the plurality of characteristic API call sequences respectively correspond to and respectively represent runtime characteristic behavior performed by a plurality of virus families, each characteristic API call sequence having a corresponding key API call sequence in the plurality of key API call sequences, wherein each of the corresponding key API call sequences comprise API calls that represent impactful key APIs used in operation by a respective virus family of the plurality of virus families; for each of the plurality of characteristic API call sequences, determining a number of characteristic API calls that are in the sample API call sequence; when the number of characteristic API calls that are in the sample API call sequence reaches a first set limit, generating an indication that the virus sample is likely virus; when the number of characteristic API calls that are in the sample API call sequence lies below the first set limit, for each of the plurality of key API call sequences, determining a number of key API calls that are in the sample API call sequence; and when the number of key API calls that are in the sample API call sequence reaches a second set limit, generating an indication that the virus sample may be a virus.

Example 30 includes the method of Example 29, wherein: obtaining a plurality of characteristic API call sequences includes determining a first API type and API call order called for each one of the plurality of virus families; generating and recording a sample API call sequence includes determining a second API type and API call order called for the virus sample; and determining a number of characteristic API calls that arc in the sample API call sequence includes calculating at least one of the first matching result or the second matching result by using a string matching algorithm.

Example 31 includes a method of identifying virus variants comprising: obtaining an API call sequence of a runtime behavior of a virus sample in a system; obtaining a characteristic library including characteristic Application Programming Interface (API) call sequences of virus families, and key API call sequences of corresponding ones of the characteristic API call sequences of the virus families; comparing the API call sequence of the virus sample to the characteristic library; determining that the virus sample is a virus variant when matches between the API call sequence of the virus sample and at least one of the characteristic API call sequences reach a first rate; and when matches between the API call sequence of the virus sample and the characteristic API call sequences do not reach the first rate, determining that the virus sample is the virus variant when matches between the API call sequence of the virus sample and at least one of the key API sequences reach a second rate.

Example 32 include the method of Example 31, wherein obtaining the API call sequence of the runtime behavior of the virus sample comprises: running the virus sample to be tested; and recording API call sequences that represent runtime characteristics behavior performed of the virus sample.

Example 33 includes the method of Example 32, wherein obtaining the API call sequence of the runtime behavior of the virus sample comprises: calling an operating system simulation environment to pile and mark key APIs.

Example 34 includes the method of Example 32, wherein running the set of virus samples includes: periodically sensing different kinds of simulated self-activation events to trigger running of the virus sample.

Example 35 includes the method of Example 31, wherein obtaining the characteristic library comprise: running a set of virus samples of the virus families; and recording an API type and an API call order in each of the virus families during the running of the set of virus samples.

Example 36 includes the method of Example 35, wherein running the set of virus samples includes: periodically sending different kinds of simulated self-activation events to trigger running of the virus samples of the virus families.

Example 37 includes the method of Example 31, wherein obtaining the characteristic library comprises: calling an operating system simulation environment to pile and mark key APIs.

Example 38 includes the method of Example 1, wherein, based on the matching result, the API call sequence of the virus sample matches to an extent at least one of the plurality of characteristic API call sequences that respectively correspond to the plurality of virus families, further comprising: determining a first API type and API call order called for each one of the plurality of virus families; determining a second API type and API call order called for the virus sample; for each one of the plurality of virus families, calculating a matching rate between the first and the second API types and API call orders; and determining the API call sequence of the virus sample matches at least one of the plurality of characteristic API call sequences by the matching rate meeting a first set limit.

Example 39 includes the method of Example 38, wherein the matching rate does not meet the first set limit, further comprising: obtaining a key API call sequence of at least one of the plurality of virus families; determining a third API type and API call order called for the at least one of the plurality of virus families by using the key API call sequence, wherein the key API call sequence includes a key API selected from a characteristic API call sequence that respectively corresponds to the at least one of the plurality of virus families, and wherein the key API is preset and able to affect safe operation of a system; and generating a second matching result by calculating a second matching rate between the second and the third API types and API call orders.

Example 40 includes the method of Example 39, further comprising: determining whether the API call sequence of the virus sample matches the key API call sequence by determining whether the second matching rate meets a second set limit.

Example 41 includes the method of Example 40, further comprising: presenting the second matching result to a sender of the virus sample; and determining whether the API call sequence of the virus sample matches the key API call sequence based on a feedback from the sender.

Example 42 includes the method of Example 41, wherein the sender includes a client.

Example 43 includes a method of identifying software virus variants comprising: recording an API call sequence for a virus sample; comparing the API call sequence of the virus sample to characteristic API call sequences of virus families to determine matches between the API call sequence of the virus sample and the characteristic API call sequences of the virus families; determining that the virus sample is a virus variant when matches between the API call sequence of the virus sample and one or more of the characteristic API call sequences of the virus families reach a first rate; comparing the API call sequence of the virus sample to key API call sequences of the virus families to determine matches between the API call sequence of the virus sample and the key API call sequences of the virus families; and determining that the virus sample can be a virus variant when matches between the API call sequence of the virus sample and one or more of the key API call sequences of the virus families reach a second rate.

Example 44 includes the method of Example 43, wherein recording the API call sequence for the virus sample comprises: pile and marking key APIs of execution of the virus sample in an operating system simulation environment.

Example 45 includes the method of Example 44, wherein pile and marking the key APIs includes: recording the calling party of a given API that possess important impact based on past development experience, the name of the given API, and the class name of the given API.

Example 46 includes the method of Example 43, further comprising: simulating a physical triggering event that is used to activate the running of a virus during running of the virus sample and the running of the set of virus samples.

Example 47 includes the method of Example 43, wherein key API call sequences correspond to self-activation operations, connecting to Internet operations, obtaining private data operations, sending text message operations.

Example 48 includes the method of Example 43, wherein comparing the API call sequence of the virus sample to the characteristic API call sequences of the virus families comprises string matching one or more API timing sequence in the API call sequence path of the virus sample with at least one of the characteristic API call sequences of the virus families.

Example 48 includes the method of Example 43, further comprising: presenting the second matching result to a sender of the virus sample; and determining whether the API call sequence of the virus sample matches the key API call sequence based on a feedback from the sender.

Example 50 includes the method of Example 49, wherein the sender includes a client.

It is also necessary to point out that, in the claims and specification of the present disclosure, terms such as "first" and "second" only are for distinguishing an embodiment or an operation from another embodiment or operation. It does not require or imply that those embodiments or operations have any such real relationship or order. Further, as used herein, the terms "comprising," "including," or any other variation is intended to cover a non-exclusive inclusion such that a process, method, article, or device that comprises a list of elements does not include only those elements but may include other elements not expressly listed or inherent to such process, method, article, or device. Absent further limitation, elements recited by the phrase "comprising a" do not exclude a process, method, article, or device that comprises such elements from including other same elements.

Although certain embodiments and methods have been disclosed herein it will be apparent from the foregoing disclosure to those skilled in the art that variations and modifications of such embodiments and methods may be made without departing from the spirit and scope of the disclosure. It is intended that the disclosures shall be limited only to the extent required by the appended claims and the rules and principles of applicable law.

What is claimed is:

1. A method of identifying virus variants comprising:
    obtaining an API call sequence of a runtime behavior of a virus sample in a system;
    obtaining a characteristic library including characteristic Application Programming Interface (API) call sequences of virus families, and key API call sequences of corresponding ones of the characteristic API call sequences of the virus families;
    comparing the API call sequence of the virus sample to the characteristic library;
    determining that the virus sample is a virus variant when matches between the API call sequence of the virus sample and at least one of the characteristic API call sequences reach a first rate, including;
        determining a first API type and API call order called for each one of the plurality of virus families:
        determining a second API type and API call order called for the virus sample;
        for each one of the plurality of virus families, calculating a matching rate between the first and the second API types and API call orders; and
        determining the API call sequence of the virus sample matches at least one of the plurality of characteristic API call sequences by the matching rate meeting a first set limit; and
    when matches between the API call sequence of the virus sample and the characteristic API call sequences do not reach the first rate, determining that the virus sample can be the virus variant when matches between the API call sequence of the virus sample and at least one of the key API sequences reach a second rate.

2. The method of claim 1, wherein obtaining the API call sequence of the runtime behavior of the virus sample comprises:
    running the virus sample to be tested; and
    recording API call sequences that represent runtime characteristics behavior performed of the virus sample.

3. The method of claim 2, wherein obtaining the API call sequence of the runtime behavior of the virus sample comprises:
    calling an operating system simulation environment to pile and mark key APIs.

4. The method of claim 2, wherein running the set of virus samples includes:
    periodically sensing different kinds of simulated self-activation events to trigger running of the virus sample.

5. The method of claim 1, wherein obtaining the characteristic library comprise:
    running a set of virus samples of the virus families; and
    recording an API type and an API call order in each of the virus families during the running of the set of vials samples.

6. The method of claim 5, wherein running the set of virus samples includes:
    periodically sending different kinds of simulated self-activation events to trigger running of the virus samples of the virus families.

7. The method of claim 1, wherein obtaining the characteristic library comprises:
    calling an operating system simulation environment to pile and mark key APIs.

8. The method of claim 1, wherein the matching rate does not meet the first set limit, further comprising:
    obtaining a key API call sequence of at least one of the plurality of virus families;
    determining a third API type and API call order called for the at least one of the plurality of virus families by using the key API call sequence, wherein the key API call sequence includes a key API selected from a characteristic API call sequence that respectively corresponds to the at least one of the plurality of virus families, and wherein the key API is preset and able to affect safe operation of a system; and
    generating a second matching result by calculating a second matching rate between the second and the third API types and API call orders.

9. The method of claim 8, further comprising:
    determining whether the API call sequence of the virus sample matches the key API call sequence by determining whether the second matching rate meets a second set limit.

10. The method of claim 9, further comprising:
    presenting the second matching result to a sender of the virus sample; and
    determining whether the API call sequence of the virus sample matches the key API call sequence based on a feedback from the sender.

11. The method of claim 10, wherein the sender includes a client.

12. A method of identifying software virus variants comprising:
    recording an API call sequence for a virus sample;
    comparing the API call sequence of the virus sample to characteristic API call sequences of virus families to determine matches between the API call sequence of the virus sample and the characteristic API call sequences of the virus families;
    determining that the virus sample is a virus variant when matches between the API call sequence of the virus sample and one or more of the characteristic API call sequences of the virus families reach a first rate;
    comparing the API call sequence of the virus sample to key API call sequences of the virus families to determine matches between the API call sequence of the virus sample and the key API call sequences of the virus families; and
    determining that the virus sample can be a virus variant when matches between the API call sequence of the virus sample and one or more of the key API call sequences of the virus families reach a second rate.

13. The method of claim 12, wherein recording the API call sequence for the virus sample comprises:
    pile and marking key APIs of execution of the virus sample in an operating system simulation environment.

14. The method of claim 13, wherein pile and marking the key APIs includes:
    recording the calling party of a given API that possess important impact based on past development experience, the name of the given API, and the class name of the given API.

15. The method of claim 12, further comprising:
    simulating a physical triggering event that is used to activate the running of a virus during running of the virus sample and the running of the set of virus samples.

16. The method of claim 12, wherein key API call sequences correspond to self-activation operations, connecting to Internet operations, obtaining private data operations, sending text message operations.

17. The method of claim 12, wherein comparing the API call sequence of the virus sample to the characteristic API call sequences of the virus families comprises string matching one or more API timing sequence in the API call sequence path of the virus sample with at least one of the characteristic API call sequences of the virus families.

18. Method of claim 12, further comprising:
    presenting the second matching result to a sender of the virus sample; and
    determining whether the API call sequence of the virus sample matches the key API call sequence based on a feedback from the sender.

19. The method of claim 18, wherein the sender includes a client.

* * * * *